US010270942B2

(12) United States Patent
Mazzante et al.

(10) Patent No.: US 10,270,942 B2
(45) Date of Patent: Apr. 23, 2019

(54) METHOD OF MAPPING SOURCE COLORS OF AN IMAGE IN A CHROMATICITY PLANE

(71) Applicant: THOMSON LICENSING, Issy les Moulineaux (FR)

(72) Inventors: Angelo Mazzante, Melesse (FR); Marie-Jean Colaitis, Cesson-Sévigné (FR); Jurgen Stauder, Montreuil/Ille (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 4 days.

(21) Appl. No.: 15/619,460

(22) Filed: Jun. 10, 2017

(65) Prior Publication Data

US 2017/0359490 A1 Dec. 14, 2017

(30) Foreign Application Priority Data

Jun. 10, 2016 (EP) .................................. 16305695

(51) Int. Cl.
*H04N 1/60* (2006.01)
*G06T 7/90* (2017.01)
(52) U.S. Cl.
CPC ............. *H04N 1/6066* (2013.01); *G06T 7/90* (2017.01); *H04N 1/6008* (2013.01); *H04N 1/6061* (2013.01)
(58) Field of Classification Search
CPC .. H04N 1/6066; H04N 1/6008; H04N 1/6061; G06T 7/90
See application file for complete search history.

(56) References Cited

U.S. PATENT DOCUMENTS

| 6,992,682 | B1* | 1/2006 | D'Souza | G09G 5/02 |
| | | | | 345/589 |
| 8,922,720 | B1 | 12/2014 | Gish et al. | |
| 2006/0244983 | A1 | 11/2006 | Zeng | |
| 2006/0262224 | A1* | 11/2006 | Ha | G09G 5/04 |
| | | | | 348/582 |
| 2010/0097407 | A1* | 4/2010 | Zulch | G01J 3/504 |
| | | | | 345/690 |

(Continued)

FOREIGN PATENT DOCUMENTS

WO WO2011143117 11/2011

OTHER PUBLICATIONS

Song et al., "A Gamut Expansion Algorithm Based on Saturation for Wide-Gamut Displays", International Conference on Multimedia Technology (ICMT), Ningbo, China, Oct. 29, 2010, pp. 1-3.

(Continued)

*Primary Examiner* — David F Dunphy
(74) *Attorney, Agent, or Firm* — Brian J. Dorini; Patricia A. Verlangieri

(57) ABSTRACT

Source colors are mapped within a mapping segment starting at a preserved gamut boundary color ($P_C$) and ending at a target gamut boundary color ($I_{T-C}$) of the chromaticity plane, corresponding, in a linear 3D color space, to an intersection of the target color gamut (TCG) with a plane of constant luminance and with a mapping plane (MKO) comprising said source color (M), a black point (K) and a white point (O).

15 Claims, 3 Drawing Sheets

(56) References Cited

U.S. PATENT DOCUMENTS

| | | | |
|---|---|---|---|
| 2011/0096249 A1* | 4/2011 | Belik | G09G 3/3413 |
| | | | 348/791 |
| 2011/0249016 A1 | 10/2011 | Zhang et al. | |
| 2013/0141764 A1* | 6/2013 | Nishikawa | H04N 1/6058 |
| | | | 358/3.23 |
| 2014/0340434 A1* | 11/2014 | El-Ghoroury | G09G 3/3607 |
| | | | 345/690 |
| 2015/0221281 A1 | 8/2015 | Bosco et al. | |
| 2016/0037019 A1* | 2/2016 | Xue | H04N 1/6075 |
| | | | 345/590 |
| 2017/0237962 A1* | 8/2017 | Oh | H04N 7/015 |
| | | | 348/474 |
| 2017/0359487 A1* | 12/2017 | Andersen | H04N 1/6005 |

OTHER PUBLICATIONS

Anonymous, "Parameter values for the HDTV standards for production arid international programme exchange", International Telecommunication Union, ITU-R, Recommendation ITU-R BT.709-6, BT Series Broadcast service (television), Jul. 2015, pp. 1-19.

Kerr, D., "A Metric for Chromaticity Difference", http://dougkerr.net/Pumpkin/articles/Chromaticity_Metric.pdf, Issue 1, Feb. 28, 2008, pp. 1-9.

\* cited by examiner

METHOD OF MAPPING SOURCE COLORS OF AN IMAGE IN A CHROMATICITY PLANE

REFERENCE TO RELATED EUROPEAN APPLICATION

This application claims priority from European No. 16305695.5, entitled "METHOD OF MAPPING SOURCE COLORS OF AN IMAGE IN A CHROMATICITY PLANE," filed on Jun. 10, 2016, the contents of which are hereby incorporated by reference in its entirety.

TECHNICAL FIELD

The invention relates to the field of mapping colors from a source color gamut into a target color gamut using the CIEXYZ chromaticity plane.

BACKGROUND ART

Source color gamuts and target color gamuts can generally be represented in 3D linear color spaces, such as a RGB or CIEXYZ color spaces.

The CIE XYZ color space was deliberately designed so that the Y parameter was a measure of the brightness or luminance of a color. It is known that each color M represented by three color coordinates X,Y,Z in such a color space has a chromaticity x,y that can be represented by a chromaticity point $M_C$ in a chromaticity plane, wherein this chromaticity x, y is calculated as follows:

$$x = \frac{X}{X+Y+Z}$$
$$y = \frac{Y}{X+Y+Z}$$

As illustrated in FIG. 1, it is then common to represent the chromaticity of a color in this chromaticity plane xy. The derived 3D color space specified by x, y, and Y is known as the CIE xyY color space and is also widely used to specify colors in practice.

Note that in a La*b* perceptual non-linear color space, a*b* planes are not chromaticity planes but rather chrominance planes.

Reversely, note that the X and Z coordinates representing this color M in the CIE XYZ color space can be calculated back from the chromaticity values x and y and from Y as follows:

$$X = \frac{Y}{y}x$$
$$Z = \frac{Y}{y}(1-x-y)$$

Note that any straight line in the chromaticity plane xy corresponds to a plane comprising the origin K of the CIE XYZ color space. As a matter of fact, replacing x and y by their values in any equation of a straight line in the chromaticity plane (i.e.: x+a.y+=0) will give the following equation of a plane in the XYZ color space (namely: (1+b).X+(a+b).Y+b.Z=0).

Similarly, any point in the chromaticity plane xy corresponds to a straight line comprising the origin K of the CIE XYZ color space. As a matter of fact, having fixed $x=x_0$ and $y=y_0$ in the chromaticity plane will give the following set of two linear equations X=f(Y); Z=f'(Y) defining a straight line in the XYZ color space, namely: $X=(x_0/y_0).Y$; $Z=[(1-x_0-y_0)/y_0].Y$.

The above two correspondences can be for instance applied to a cube in the XYZ color space having the following eight vertices: Black Point K corresponding to the origin of the XYZ color space, a first primary color R, a second primary color G, a third primary color B, a first secondary color C combining the second and the third primary colors, a second secondary color M combining the third and the first primary colors, a third secondary color Y combining the first and the second primary colors, and a white color O combining the three primary colors. Planes of the CIE XYZ color space that are defined as including OGBC, OBRM and ORGY will then correspond to the three sides of a triangle in the xy chromaticity diagram, i.e. respectively $G_CB_C$, $B_CR_C$ and $R_CG_C$. The diagonal OW of this cube will correspond to a point $W_C$ positioned roughly at the center of this triangle. Any point $M_C$ located inside this triangle will correspond to a straight line passing through K and the corresponding color M in the XYZ color space, and this straight line will intersect at an intersecting point I" of the surface of the cube.

For mapping colors of an image, it is known to use such a chromaticity plane. See for instance the document US2015/221281. More specifically, it is known to map each color of such an image along a mapping straight line comprising the chromaticity point of this color and the chromaticity point of a white point, and still more specifically to map this color within a mapping segment of this mapping straight line. See for instance the document US2011/249016. The article entitled "A Gamut Expansion Algorithm Based on Saturation for Wide-gamut Displays", by Gang Song et al., published in IEEE in 2010 discloses also such a method.

SUMMARY OF INVENTION

An object of the invention is to delimit this mapping segment, notably such as to get all mapped colors within the target color gamut.

For this purpose, the subject of the invention is a method of mapping source colors of an image from a 3D source color gamut into a 3D target color gamut, both gamuts sharing a common black and a common white, said method comprising mapping each of said source colors which are out of a preserved color gamut in a chromaticity plane along a mapping straight line comprising the chromaticity point of said source color and the chromaticity point of said white point, wherein said mapping of said source color is performed within a mapping segment of said mapping straight line, wherein said mapping segment starts at the chromaticity point of a preserved gamut boundary color associated with said source color, wherein said mapping segment ends at the chromaticity point of a target gamut boundary color associated with said source color, wherein the chromaticity point of said preserved gamut boundary color is positioned on said mapping straight line between the chromaticity point of said white point and the chromaticity point of said target gamut boundary color, wherein said target gamut boundary color corresponds, in a linear 3D color space, to an intersection of said target color gamut with a plane of constant luminance and with a mapping plane comprising said source color, said black point and said white point.

The chromaticity plane is defined in relation with the linear 3D color space such that any straight line comprising the common black (K) in the linear 3D color space correspond to a chromaticity point in the chromaticity plane (xy). Typically, the linear 3D color space can be the CIE XYZ color space and the chromaticity plane can then be the CIE xy plane.

In summary, source colors are mapped within a mapping segment starting at a preserved gamut boundary color and ending at a target gamut boundary color of the chromaticity plane, corresponding, in a linear 3D color space, to an intersection of the target color gamut with a plane of constant luminance and with a mapping plane comprising said source color, the black point and the white point.

As, by definition, the target gamut boundary color belongs to this mapping plane, as this plane corresponds to the mapping line in the chromaticity plane, it means that the chromaticity point of said target gamut boundary color as defined above belongs indeed to the mapping line.

This target gamut boundary color can also be found as follows:
- defining a line of intersection of said target color gamut with the same mapping plane,
- defining the target gamut boundary color as the intersection of this line with the same plane of constant luminance.

The preserved color gamut can be reduced to a single color as for instance the white point or the black point.

Preferably, the chromaticity plane is CIE xy plane.

Preferably, the linear 3D color space is a RGB color space.

Preferably, said target color gamut is also defined by three primary colors and corresponding chromatic points defining a primary triangle in said chromatic plane, and there is at least one of said source colors to map having a chromaticity point of its corresponding target gamut boundary color ending its mapping segment which is positioned on its mapping line between the chromaticity point of its corresponding preserved gamut boundary color and an intersection of said mapping line with an edge of said primary triangle.

In this situation, it means that the chromaticity point of the target gamut boundary color is not located on an edge of the primary triangle and that the mapping segment dedicated to the mapping of the source color is shorter than in the prior art. Advantageously, the mapping is then more accurate.

Preferably, the luminance of said plane of constant luminance is the luminance of said source color.

Preferably, said preserved color gamut is projected as a preserved color line in said chromaticity plane, and wherein said chromaticity point of the preserved gamut boundary color associated with said source color correspond to the intersection of said preserved color line with said mapping straight line.

Preferably, a chromaticity point of a source gamut boundary color is associated with said source color and is defined as an intersection, in said linear 3D color space, of said source color gamut with said plane of constant luminance and with said mapping plane, and said mapping of said source color into a target color is performed within said mapping segment such that the distance, measured in said chromaticity plane, between the chromaticity point of said preserved gamut boundary color and the chromaticity point of said target color is an homogeneous increasing function of the distance, measured in said chromaticity plane, between the chromaticity point of said preserved gamut boundary color and the chromaticity point of said source color and of the ratio between:
- the distance, measured in said chromaticity plane, between the chromaticity point of said preserved gamut boundary color and the chromaticity point of said target boundary color and
- the distance, measured in said chromaticity plane, between the chromaticity point of said preserved gamut boundary color and the chromaticity point of said source boundary color.

Preferably, said function is such that, when said source color corresponds to said preserved gamut boundary color, said target color corresponds to the same preserved gamut boundary color, and such that, when said source color corresponds to said source gamut boundary color, said target color corresponds to said target gamut boundary color.

Preferably, said function is invertible. It means for instance that, if source colors of the image are mapped into target colors using such a color mapping method based on this function, the obtained target colors can be inverse-mapped into the same source colors using an inverse of said function.

A subject of the invention is also a method of transmission of an image comprising:
- mapping source colors of said image into target colors, from a 3D source color gamut into a 3D target color gamut, according to the method of mapping based on said function,
- encoding said target colors into encoded target colors,
- transmitting said encoded target colors,
- decoding said encoded target colors into decoded target colors,
- inverse-mapping said decoded target colors into source colors, from said 3D target color gamut into said 3D source color gamut, according to the method of mapping based on the inverse of said function.

Through such a method of transmission, the original source colors can be easily restored, such as in the document U.S. Pat. No. 8,922,720.

A subject of the invention is also an image processing device configured to implement the above method.

A subject of the invention is also an electronic device incorporating such an Image processing device. Such an electronic device can be for instance an image capture device such as a camera, an image display device such as a TV set, a monitor, a head mounted display, or a set top box, a gateway, a smartphone or a tablet.

A subject of the invention is also a computer program product comprising program code instructions to execute the steps of the above method, when this program is executed by a processor.

BRIEF DESCRIPTION OF DRAWINGS

The invention will be more clearly understood on reading the description which follows, given by way of non-limiting example and with reference to the appended figures in which.

DESCRIPTION OF EMBODIMENTS

It will be appreciated by those skilled in the art that flow charts presented herein represent conceptual views of illustrative circuitry embodying the invention. They may be substantially represented in computer readable media and so executed by a data processing device, whether or not such device is explicitly shown. The functions of the various elements shown in the figures may be provided through the use of hardware capable of executing software in association with appropriate software. Such hardware capable of executing such software generally uses processor, controller, digital signal processor ("DSP") hardware, read-only memory ("ROM") for storing software, random access memory ("RAM"), and non-volatile storage.

The invention may notably be implemented by any device capable of processing images, notably capable of implementing color and/or tone mapping or inverse color and/or tone mapping of images. Therefore, the invention can be notably implemented in an image capture device such as a camera, an image display device such as a TV set, a monitor, a head mounted display, or a set top box or a gateway, as such devices are generally capable of processing images. The invention can also be implemented in a device comprising both an image capture display device and an image display device, such as a smartphone or a tablet. All such devices comprise hardware capable of executing software that can be adapted in a manner known per se to implement the invention.

Figure 3:
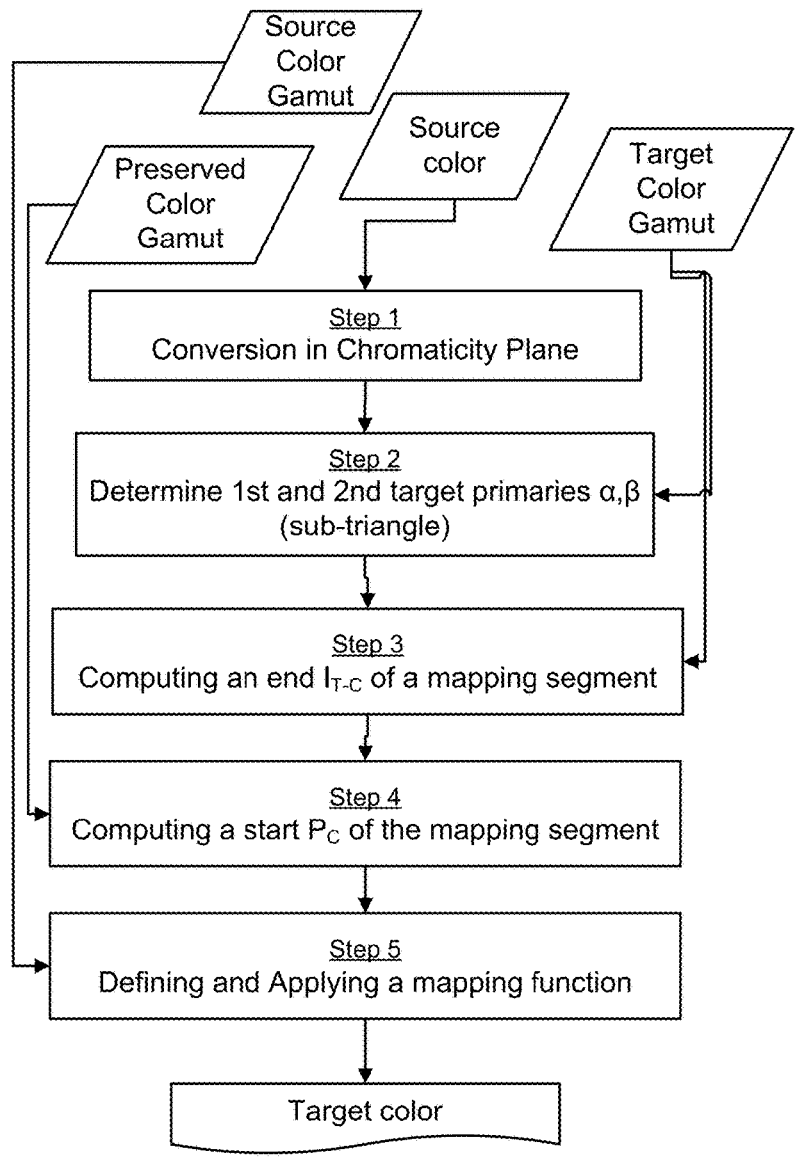
FIG. 3 illustrates a flowchart illustrating a preferred embodiment of the mapping method according to the invention.

A main embodiment of a method of color mapping according to the invention will now be described in reference to FIG. 3. According to this embodiment, an image is provided to this device capable of processing images the source colors of which are represented in the linear source RGB color space inside a 3D source color gamut SCG. This source color gamut SCG is based and defined by three source primary colors. Any source color to map is represented by a point M in the RGB or XYZ color space and by a corresponding point Mc in the chromaticity plane. This point M has coordinates $R_M, G_M, B_M$ in the RGB source color space, coordinates $X_M, Y_M, Z_M$ in the XYZ color space, and the corresponding point $M_C$ has the chromaticity coordinates $x_M, y_M$. A 3D target color gamut TCG based in which these source colors should be mapped by this device is also provided to this device. This target color gamut TCG is based and defined by three target primary colors. A 3D preserved color gamut PCG in which all source colors will not change (i.e. will be preserved) after mapping is also provided to this device.

It is assumed that the source color gamut SCG and the target color gamut TCG are respectively defined as cubes in the linear source RGB color space and in a linear target RGB color space, and share a common black K and a common white O. For instance and in reference to FIG. 2, the source color gamut corresponds to that of the DCI-P3 of the digital movie projection from the US-American film industry, the target color gamut corresponds to that recommended by the ITU Rec. 709, and the common white point corresponds to a D65 white.

1$^{st}$ Step: Conversion of RGB Color Data to XYZ and xyY Color Data, Including Conversion of Color Gamuts.

Such a conversion of the color coordinates $R_M, G_M, B_M$ of the source colors of the image is obtained through the following well-known equations 1.1 and 1.2:

$$\begin{pmatrix} X_M \\ Y_M \\ Z_M \end{pmatrix} = \begin{pmatrix} C_{XR} & C_{XG} & C_{XB} \\ C_{YR} & C_{YG} & C_{YB} \\ C_{ZR} & C_{ZG} & C_{ZB} \end{pmatrix} \begin{pmatrix} R_M \\ G_M \\ B_M \end{pmatrix} \quad \text{equation 1.1}$$

and $$x_M = \frac{X_M}{X_M + Y_M + Z_M} \quad y_M = \frac{Y_M}{X_M + Y_M + Z_M} Y_M \quad \text{equation 1.2}$$

where the matrix $(C_{ij})_{i=X,Y,Z, j=R,G,B}$ is the well known Normalized Primaries Matrix of the reference R, G, B, O primaries defining the 3D target color gamut. This matrix transforms normalized linear RGB coordinates of a source color to CIE XYZ tristimulus values representing the same color in the CIE XYZ color space.

Figure 1:
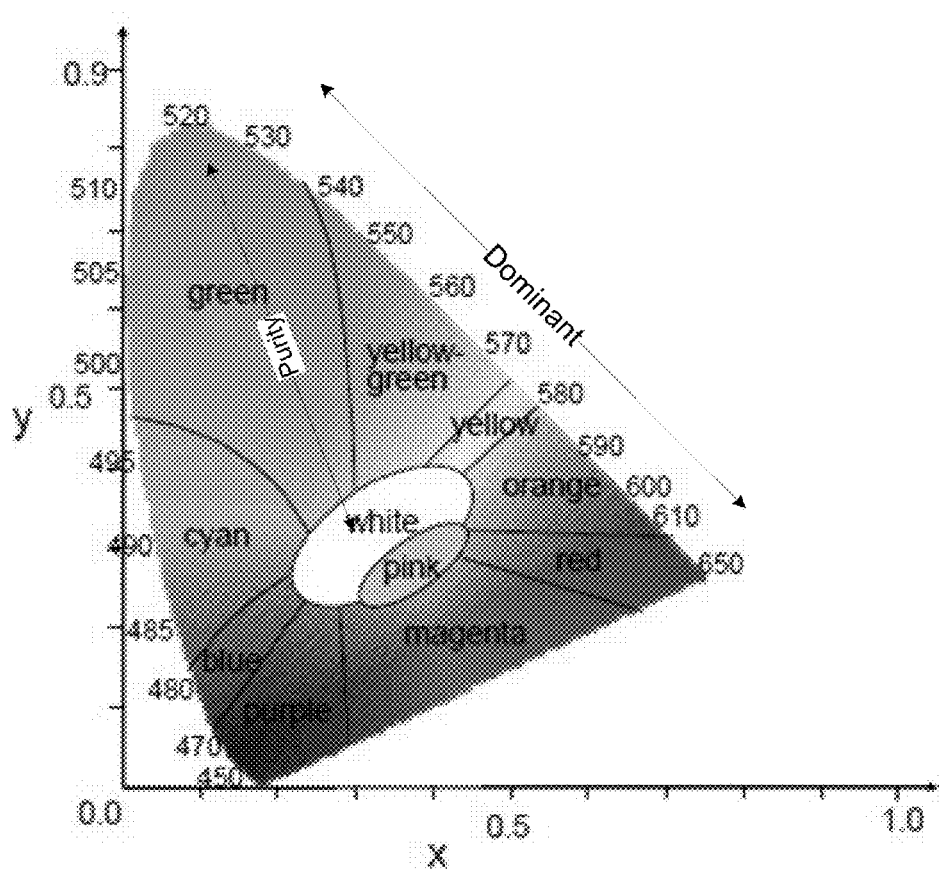
FIG. 1, already disclosed, shows a chromaticity plane in which the chromaticity x, y of colors can be represented.
Figure 2:
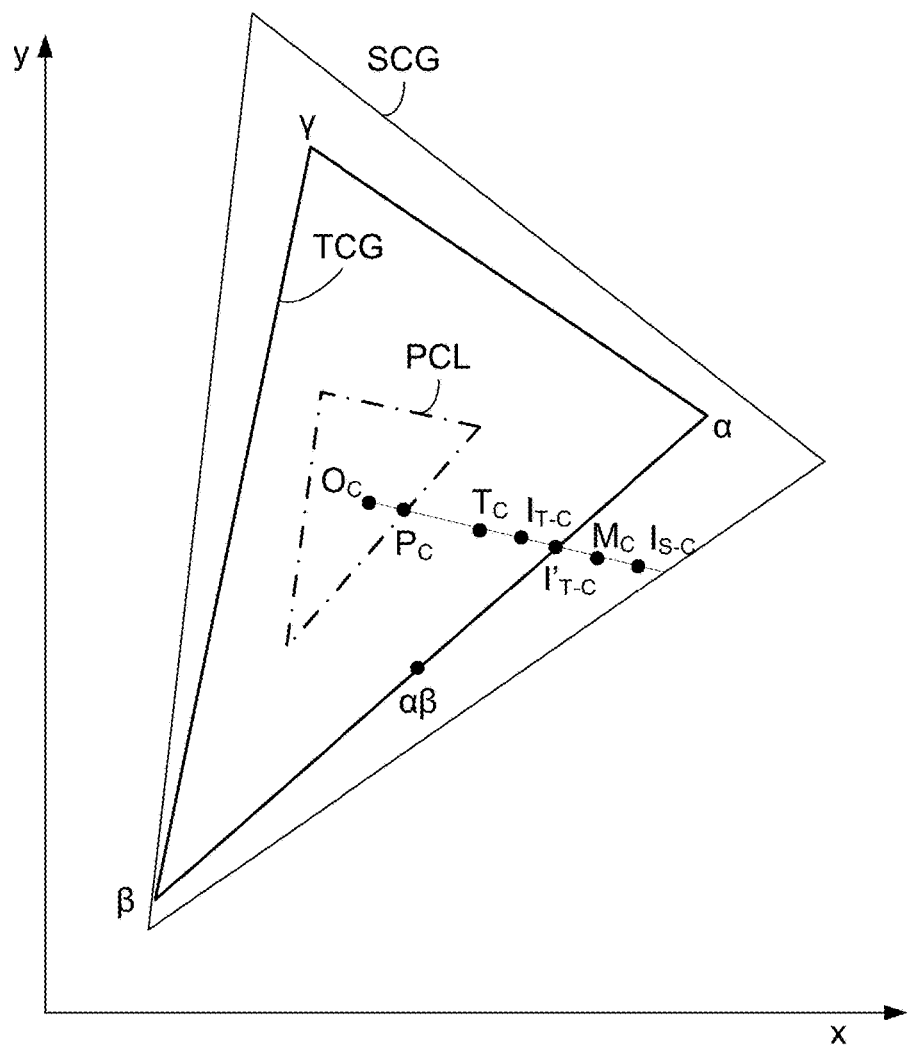
FIG. 2 shows the different chromaticity points used to implement the embodiment of FIG. 3.

Using equations 1.1 and 1.2 above, the source color gamut cube and the target color gamut cube are also converted in the XYZ color space into polyhedrons having rectangular facets and in the 2D xy chromaticity plane into triangles as shown on FIG. 2. A similar conversion is performed for the preserved color gamut PCG resulting here in a triangle in the chromaticity plane. Shape differing from triangle may be envisaged.

It is known that such a matrix $(C_{ij})_{i=X,Y,Z, j=R,G,B}$ notably defined such that:
- A pure primary source color from the RGB color space has a single component as per $\alpha \rightarrow V_\alpha = 1$, and two other components $\beta, \gamma \rightarrow V_\gamma = V_\beta = 0$, with $\alpha, \beta, \gamma \in \{R, G, B\}$. The luminance Y at this point is defined by the second row of the matrix: $Y = 1 * C_{Y\alpha}$ with $\alpha \in \{R, G, B\}$;
- Any side of color gamut triangles can be defined by two components $\alpha, \beta \rightarrow V_\alpha \neq 0, V_\beta \neq 0$, with the third opponent component $\gamma \rightarrow V_\gamma = 0$. The luminance Y is then $Y = V_\alpha * C_{Y\alpha} + V_\beta * C_{Y\beta}$ with $V_\alpha, V_\beta \in [0,1]$
- The luminance on the gamut side is at its maximum when the two primaries are 1: $V_A = V_\beta = 1 \rightarrow Y_{max} = C_{Y\alpha} + C_{Y\beta}$, therefore corresponding to a secondary color Cyan, Magenta or Yellow;
- The white point primary O has the three RGB components set to one $Y = 1 = C_{YR} = C_{YG} + C_{YB}$. The gray line from black to white is orthogonal to the xy chromaticity plane in the xyY color space, and located at the point $O_C$ in the xy chromaticity plane having the following coordinates $x_w, y_w$. This line is defined by $Y = \epsilon * (C_{YR} + C_{YG} + C_{YB})$ with $\epsilon \in [0,1]$. This gray line corresponds to a diagonal in the RGB color gamut cubes or in the XYZ color gamut polyhedrons.

2$^{nd}$ Step: Determine the xy Chromaticity Plane the Sub-triangle of the Target Color Gamut the Source Color M to Map Belongs to:

The triangle representing the target color gamut in the 2D xy chromaticity plane is splitted into six sub-triangles, each of these sub-triangles being defined in the 2D xy chromaticity plane by the white point $O_C$, a first primary color and a first secondary color composed of this first primary color and of another second primary color. In the 2D xy chromaticity plane, this first secondary color lies on the side of the target color gamut triangle joining these two primary colors. See FIG. 2.

At this step, a first primary color $\alpha \in \{R, G, B\}$ of the target color gamut and a second primary color $\beta \in \{R, G, B\}$ of the target color gamut are determined such as to define in the chromaticity plane the sub-triangle O-α-αβ to which the source color $M_C$ belongs, where αβ is the secondary color combining the first primary color α and the second primary color β. Such a determination is performed in a manner known per se from the position of the point $M_C$ corresponding to the source color to map M, i.e. from the coordinates $x_M$, $y_M$ of this point $M_C$ in the chromaticity plane.

In the chromaticity plane, colors lying on the segment α-αβ of the sub-triangle O-α-αβ correspond to colors lying on half a face of the target color gamut cube, which is delimited, in the RGB color space, by the black point K, the first primary color a and the secondary color αβ.

In the RGB color space, if the color coordinates of the first primary color are [1,0,0] and of the second primary color is [0,1,0], the color coordinates of the secondary color αβ are [1,1,0]. Therefore, in the XYZ color space, the color coordinates of the first primary is $X_α=C_{Xα}$, $Y_α=C_{Yα}$ and $Z_α=C_{Zα}$ and the color coordinates of the secondary color αβ is $X_{αβ}=C_{Xα}+C_{Xβ}$, $Y_{αβ}=C_{Yα}+C_{Yβ}$ and $Z_{αβ}=C_{Zα}+C_{Zβ}$. In the xy chromaticity plane, the color coordinates of the first primary α is $x_α=C_{Xα}/(C_{Xα}+C_{Yα}+C_{Zα})$ and $y_α=C_{Yα}/(C_{Xα}+C_{Yα}+C_{Zα})$. In the xy chromaticity plane, the color coordinates of the secondary color αβ is $x_{αβ}=(C_{Xα}+C_{Xβ})/(C_{Xα}+C_{Yα}+C_{Zα}+C_{Xβ}+C_{Yβ}+C_{Zβ})$ and $y_{αβ}=(C_{Yα}+C_{Yβ})/(C_{Xα}+C_{Yα}+C_{Zα}+C_{Xβ}+C_{Yβ}+C_{Zβ})$. For any color x,y lying on the segment of the sub-triangle joining the primary color α and the secondary color αβ, we have:

$$y=[(y_{αβ}-y_α)x+(x_{αβ}y_α-x_αy_{αβ})]/(x_{αβ}-x_α)$$ equation 2.1

Optionally, it is possible to compute, in the xy chromaticity plane, the coordinates of intersection I'T-C of the mapping straight line $O_CM_C$ with the side segment α-αβ of the determined sub-triangle.

In the xy chromaticity plane, the chromaticity point $M_C$ having $x_M$, $y_M$ as coordinates, corresponding to the color M to map, will be mapped according to the method along a mapping straight line comprising the white point $O_C$ and this chromaticity point $M_C$. This mapping straight line corresponds to a mapping plane in the RGB color space defined as comprising M, the white point O and the black point K. For any color x,y lying on this mapping straight line, we have:

$$y=[(y_M-y_W)x+(x_My_W-x_My_W)]/(x_M-x_W)$$ equation 2.2 where, in the chromaticity plane, $x_W$ and $y_W$ are the coordinates of the chromaticity point $O_C$ corresponding to the white point O.

By combining equation 2.1 and 2.2, we get the coordinates $x_{I'T-C}$, $y_{I'T-C}$ of the intersection $I'_{T-C}$ of the mapping straight line $O_CM_C$ with the line α-αβ. Note that this intersection $I'_{T-C}$ corresponds to a line in the RGB color space which is the intersection of the sub-triangle O-α-αβ with a mapping plane MKO comprising the source color M to map, the black point K and the white point O.

3$^{rd}$ Step: In the Chromaticity Plane, Computing an End $I_{T-C}$ of a Mapping Segment.

In the RGB color space, we compute as follows the intersection $I_T$ between a face of the target color gamut cube comprising the determined primary color α (see 2$^{nd}$ step above), a plane of constant luminance having the luminance of the source color to map M, and the mapping plane MKO comprising the source color M to map, the black point K and the white point O.

Having determined in the second step above the first primary color α and the second primary color β defining in the chromaticity plane the sub-triangle O-α-αβ of the target color gamut to which the source color $M_C$ to map belongs, we will now consider the following two faces of the target color gamut cube in the RGB color space:

a first face delimited by this first primary color α, the secondary color αβ combining this first primary color a and the second primary color β, the white point O, and a second secondary color αγ combining the first primary color α and a third still another primary color γ∈{R,G,B}, and the black point K. This first face is defined in the RGB color space by equation:

$$V_α=1$$ equation 3.1 a second face delimited by the first primary color α, the black point K, the second primary color β and the first secondary color αβ. This second face is defined in the RGB color space by equation by equation $$V_γ=0$$ equation 3.2

Replacing x and y of equation 2.2 above by their values in the XYZ color space (using conversion equation 1.2), we get the equation of the mapping plane MKO in the XYZ color space. Replacing in this equation X,Y,Z by their values in the RGB color space (using conversion equation 1.1), we get the equation of the mapping plane MKO in the RGB color space. Such an equation is a linear relationship between three color coordinates $V_α$, $V_β$, $V_γ$ of a color (with α,β,γ∈{R,G,B}), which can be expressed as follows:

$$V_α+p.V_β-(1+p).V_γ=0$$ equation 4 which is the equation of a plane passing though the black point K and the white point O, where p can be determined by replacing color coordinates $V_α$, $V_β$, $V_γ$ by $X_M,Y_M,Z_M$ in equation 4, i.e. by stating that M belongs to the mapping plane.

The equation of the plane having the same luminance as the luminance $Y_M$ of the source color to map is $Y=Y_M$ in the XYZ color space, or, in the RGB color space (using equation 1.1):

$$Y_M=V_{Yα}.V_α+C_{Yβ}.V_β+C_{Yγ}.V_γ$$ equation 5

Combining the three linear equations 3.1, 4 and 5 above, we compute the values of the color coordinates $I_α$, $I_β$, $I_γ$ of the intersection $I_T$ in the RGB color space. Using conversion equations 1.1 and 1.2 above, the corresponding color coordinates $X_{I,T-C}$ and $y_{I,T-C}$ of the corresponding point $I_{T-C}$ in the chromaticity plane are computed (see FIG. 2).

If one of more computed values among $I_α$, $I_β$, $I_γ$ is negative or superior to one, it means that there is no intersection of the mapping plane MKO and of the constant luminance plane $Y=Y_M$ with the first face of the target color gamut cube. Instead, we should consider the intersection $I'_T$ of the mapping plane MKO and of the constant luminance plane $Y=Y_M$ with the second face of the target color gamut cube by combining equations 3.2, 4 and 5 above. The values of the new color coordinates $I'_α$, $I'_β$, $I'_γ$ of this intersection $I'_T$ in the RGB color space are then converted as above into color coordinates $x_{I'T-C}$ and $y_{I'T-C}$ of the corresponding point $I'_{T-C}$ in the chromaticity plane (see FIG. 2). As this second face of the target color gamut cube corresponds to the segment α-αβ in the chromaticity plane, it means that this point $I'_{T-C}$ is located on this segment (see FIG. 2).

4$^{th}$ Step: In the Chromaticity Plane, Computing a Start $P_C$ of the Mapping Segment Such as to Define Said Mapping Segment $P_C$-$I_{T-C}$ of the Mapping Straight Line $O_C$-$M_C$.

Assuming that the preserved color gamut PCG is projected as a preserved color line PCL in the chromaticity plane, a point $P_C$ corresponding to a preserved gamut boundary color P is defined as the intersection of this preserved color line PCL with the mapping straight line $O_CM_C$ (see FIG. 2).

Now, a mapping segment $P_CI_{T-C}$ is defined on the mapping straight line $O_CM_C$ such as all source colors to map that are outside the preserved color gamut PCG will be mapped within this mapping segment $P_CI_{T-C}$ starting at $P_C$ and ending at $I_{T-C}$.

According to the mapping method, all colors located within the preserved color gamut PCG are preserved.

5$^{th}$ Step: In the Chromaticity Plane, Defining a Mapping Function.

The first step above is re-iterated to compute a matrix $(C_{ij})_{i=X,Y,Z,j=R,G,B}$ of the reference R, G, B, O, primaries defining the 3D source color gamut. This matrix transforms normalized linear RGB coordinates of a source color to CIE XYZ tristimulus values representing the same color in the CIE XYZ color space.

The second step above is re-iterated to determine a first primary color and a second primary color of the source color gamut SCG defining a sub-triangle to which the source color gamut $M_C$ belongs. Note that this sub-triangle may infer first or second primaries that are totally different from the first or second primaries of the target color gamut TCG.

The third step above is re-iterated to compute, in the RGB color space, the intersection $I_S$ between a face of the source color gamut cube, a plane of constant luminance having the luminance of the source color to map, and the mapping plane MKO comprising the source color M to map, the black point K and the white point O. This face of the source color gamut cube is defined as in this third step above in connection with the determined first and second primaries of the source color gamut SCG. This intersection $I_S$ corresponds to the chromatic point $I_{S-C}$ of the chromatic plane (see FIG. 2).

According to the mapping method, the source point $M_C$ will now be mapped into a target point $T_C$ within the mapping segment $P_CI_{T-C}$, such that the distance $P_CT_C$ is an homogeneous increasing function of the distance $P_CM_C$ and of the ratio $P_CI_{T-C}/P_CI_{S-C}$. Here, this ratio is inferior to 1, resulting in a compressive mapping. Preferably, this target point $T_C$ is defined such that $P_CT_C=P_CM_C\times(P_CI_{T-C}/P_CI_{S-C})$.

From the obtained target point $T_C$, a corresponding target color T can be derived using the inverse of equations 1.2 and 1.1, as having the same luminance $Y_M$ as the source color M.

When using such a function, when the source color M corresponds to the preserved gamut boundary color P, the target color T corresponds indeed to the same preserved gamut boundary color P, and when the source color M corresponds to the source gamut boundary color I"$_S$, the target color T corresponds indeed to the target gamut boundary color I"$_T$.

CONCLUSION

All source colors that are outside the preserved color gamut are mapped according to the first to fifth step above into corresponding target colors, resulting in a color mapped image.

An advantage of the color mapping embodiment as described above is that it is reversible. It means that starting from the target colors above, source colors of the original image can be easily restored using the same mapping method, wherein the target color gamut becomes the source color gamut and the source color gamut becomes the target color gamut. Using the same method will result in as expansion mapping along the same mapping line within segments $P_CI"_{S-C}$ (instead of $P_CI"_{T-C}$ above).

Such an advantage is particularly useful in the context of transmission of encoded images that can be used both by SDR display and by HDR displays, for instance as disclosed in U.S. Pat. No. 8,922,720. Starting from HDR images, it is known to tone-map them into SDR images before transmission. On the reception side, when receiving such tone-mapped SDR images, when needed for a HDR display, it becomes possible to restore the original HDR images by inverse-tone mapping the received SDR images, using the inverse of the tone-mapping performed on the emitter side.

Although the illustrative embodiments of the invention have been described herein with reference to the accompanying drawings, it is to be understood that the present invention is not limited to those precise embodiments, and that various changes and modifications may be effected therein by one of ordinary skill in the pertinent art without departing from the invention. All such changes and modifications are intended to be included within the scope of the present invention as set forth in the appended claims. The present invention as claimed therefore includes variations from the particular examples and preferred embodiments described herein, as will be apparent to one of skill in the art.

While some of the specific embodiments may be described and claimed separately, it is understood that the various features of embodiments described and claimed herein may be used in combination. Reference numerals appearing in the claims are by way of illustration only and shall have no limiting effect on the scope of the claims.

The invention claimed is:

1. A method of mapping source colors of an image from a 3D source color gamut into a 3D target color gamut, both gamuts sharing a common black and a common white,
   wherein a chromaticity point in a chromaticity plane can be derived from any straight line comprising said common black in a linear 3D color space, said method comprising mapping each of said source colors which are out of a preserved color gamut within a mapping segment of a mapping straight line included in said chromaticity plane,
   wherein said mapping straight line comprises the chromaticity point of said source color and the chromaticity point of said white point,
   wherein said mapping segment starts at the chromaticity point of a preserved gamut boundary color associated with said source color,
   wherein said mapping segment ends at the chromaticity point of a target gamut boundary color associated with said source color,
   wherein the chromaticity point of said preserved gamut boundary color is positioned on said mapping straight line between the chromaticity point of said white point and the chromaticity point of said target gamut boundary color,
   wherein said target gamut boundary color corresponds, in said linear 3D color space, to an intersection of said target color gamut with a plane of constant luminance and with a mapping plane comprising said source color, said black point and said white point.

2. The method of mapping colors according to claim 1, wherein said target color gamut is also defined by three primary colors and corresponding chromatic points defining a primary triangle in said chromatic plane,
   wherein there is at least one of said source colors to map having a chromaticity point of its corresponding target gamut boundary color ending its mapping segment which is positioned on its mapping line between the chromaticity point of its corresponding preserved gamut boundary color and an intersection of said mapping line with an edge of said primary triangle.

3. The method of mapping colors according to claim 1, wherein said chromaticity plane is the chromaticity plane of the CIE xyY color space.

4. The method of mapping colors according to claim 1, wherein the luminance of said plane of constant luminance is the luminance of said source color.

5. The method of mapping colors according to claim 1, wherein said preserved color gamut is projected as a preserved color line in said chromaticity plane, and wherein said chromaticity point of the preserved gamut boundary color associated with said source color correspond to the intersection of said preserved color line with said mapping straight line.

6. The method of mapping colors according to claim 1,
wherein a chromaticity point of a source gamut boundary color is associated with said source color and is defined as an intersection, in said linear 3D color space, of said source color gamut with said plane of constant luminance and with said mapping plane, and
wherein said mapping of said source color into a target color is performed within said mapping segment such that the distance, measured in said chromaticity plane, between the chromaticity point of said preserved gamut boundary color and the chromaticity point of said target color is an homogeneous increasing function of the distance, measured in said chromaticity plane, between the chromaticity point of said preserved gamut boundary color and the chromaticity point of said source color and of the ratio between:
the distance, measured in said chromaticity plane, between the chromaticity point of said preserved gamut boundary color and the chromaticity point of said target boundary color and
the distance, measured in said chromaticity plane, between the chromaticity point of said preserved gamut boundary color and the chromaticity point of said source boundary color.

7. The method of mapping colors according to claim 6, wherein said function is such that, when said source color corresponds to said preserved gamut boundary color, said target color corresponds to the same preserved gamut boundary color, and such that, when said source color corresponds to said source gamut boundary color, said target color corresponds to said target gamut boundary color.

8. The method of mapping colors according to claim 6, wherein said function is invertible.

9. A method of transmission of an image comprising:
mapping source colors of said image into target colors, from a 3D source color gamut into a 3D target color gamut, according to the method of claim 7 based on said function,
encoding said target colors into encoded target colors,
transmitting said encoded target colors,
decoding said encoded target colors into decoded target colors,
inverse-mapping said decoded target colors into source colors, from said 3D target color gamut into said 3D source color gamut, according to the method of claim 8 based on the inverse of said function.

10. An image processing device comprising at least one processor configured for mapping source colors of an image from a 3D source color gamut into a 3D target color gamut, both gamuts sharing a common black and a common white, wherein a chromaticity point in a chromaticity plane can be derived from any straight line of a linear 3D color space comprising said common black, said at least one processor being configured for mapping each of said source colors which are out of a preserved color gamut within a mapping segment of a mapping straight line included in a chromaticity plane,
wherein said mapping straight line comprises the chromaticity point of said source color and the chromaticity point of said white point,
wherein said mapping segment starts at the chromaticity point of a preserved gamut boundary color associated with said source color,
wherein said mapping segment ends at the chromaticity point of a target gamut boundary color associated with said source color,
wherein the chromaticity point of said preserved gamut boundary color is positioned on said mapping straight line between the chromaticity point of said white point and the chromaticity point of said target gamut boundary color,
wherein said target gamut boundary color corresponds, in a linear 3D color space, to an intersection of said target color gamut with a plane of constant luminance and with a mapping plane comprising said source color, said black point and said white point.

11. The image processing device according to claim 10, wherein said target color gamut is also defined by three primary colors and corresponding chromatic points defining a primary triangle in said chromatic plane,
wherein there is at least one of said source colors to map having a chromaticity point of its corresponding target gamut boundary color ending its mapping segment which is positioned on its mapping line between the chromaticity point of its corresponding preserved gamut boundary color and an intersection of said mapping line with an edge of said primary triangle.

12. The image processing device according to claim 10, wherein said chromaticity plane is the chromaticity plane of the CIE xyY color space.

13. An electronic device incorporating an image processing device according to claim 10.

14. The electronic device of claim 13 selected from the group consisting of a camera, a TV set, a monitor, a head mounted display, a set top box, a gateway, a smartphone and a tablet.

15. A non-transitory computer readable medium having stored thereon program code instructions which, when the program code instructions are executed by a processor, causes the processor to:
map each of said source colors which are out of a preserved color gamut within a mapping segment of a mapping straight line included in said chromaticity plane,
wherein said mapping straight line comprises the chromaticity point of said source color and the chromaticity point of said white point,
wherein said mapping segment starts at the chromaticity point of a preserved gamut boundary color associated with said source color,
wherein said mapping segment ends at the chromaticity point of a target gamut boundary color associated with said source color,
wherein the chromaticity point of said preserved gamut boundary color is positioned on said mapping straight line between the chromaticity point of said white point and the chromaticity point of said target gamut boundary color, wherein said target gamut boundary color corresponds, in said linear 3D color space, to an intersection of said target color gamut with a plane of constant luminance and with a mapping plane comprising said source color, said black point and said white point.

* * * * *